United States Patent [19]
Breed et al.

[11] 3,993,791
[45] Nov. 23, 1976

[54] CONTINUOUS LAUTERING

[75] Inventors: David H. Breed, Webb Court, Va.;
Llewellyn E. Clark, Pittsfield, Mass.

[73] Assignee: Beloit Corporation, Beloit, Wis.

[22] Filed: May 5, 1975

[21] Appl. No.: 574,273

Related U.S. Application Data

[63] Continuation-in-part of Ser. No. 409,249, Oct. 24, 1973, abandoned.

[52] U.S. Cl. .............................. 426/436; 426/478; 426/489; 426/495
[51] Int. Cl.² ........................................... C12C 7/00
[58] Field of Search .............. 99/276, 278; 426/29, 426/436, 489, 478, 495

[56] References Cited
UNITED STATES PATENTS

| | | | |
|---|---|---|---|
| 2,513,687 | 7/1950 | Strezynski | 426/189 X |
| 2,726,957 | 12/1955 | Kunz | 426/436 X |
| 2,894,841 | 7/1959 | Compton et al. | 426/495 X |
| 3,520,868 | 7/1970 | Henderson et al. | 426/436 X |
| 3,535,116 | 10/1970 | Harsanyi | 426/436 X |

*Primary Examiner*—David M. Naff
*Attorney, Agent, or Firm*—Dirk J. Veneman; Bruce L. Samlan; Gerald A. Mathews

[57] ABSTRACT

Method and apparatus for separating and washing solid particles in suspension in a liquid which includes a series of continuously decanting centrifuges and an equal number of reslurry stations. Fresh wash liquid is introduced into the last of the reslurry stations, together with solids which are discharged from the next to last decanting centrifuge. Solids are separated from liquid in the last decanting centrifuge and the effluent therefrom is directed into the next to last reslurry station for dilution of the suspension therein. The system is particularly adapted for use as a continuous lautering method for producing malt beverages.

3 Claims, 4 Drawing Figures

CONTINUOUS LAUTERING

This is a continuation-in-part of co-pending application Ser. No. 409,249 filed Oct. 24, 1973, (now abandoned).

BACKGROUND OF THE INVENTION

1. Field of the Invention

This invention is in the field of separating and washing solid particles in suspension such as the separation of wort from insoluble grain residue.

2. DESCRIPTION OF THE PRIOR ART

Brewer's wort is usually produced by mixing finely ground, kiln dried malt with water in a masher, converting the starch into maltose and dextrins at temperatures of approximately 130° to 167° F., and clarifying the fermentable mash slurry by separating the liquid solids or spent grains. The separation of the wort from the isoluble grain residue in accordance with prior procedures has required three to four hours and may require in excess of five, depending on the quality of the malt being processed, on the type of clarifying or separating apparatus employed, and on the fineness of the ground malt.

The separation of brewer's wort from insoluble grain residue has historically been accomplished by using lautering tun or other type of stationary screening device. The mash is discharged into a lautering tun which is constructed with a perforated plate above the base. The mash is then allowed to settle for a length of time sufficient to establish a filter bed. The first wort withdrawn from the lautering tun is usually recycled until clear wort is obtained. The bulk of the first wort is run off and sparging is carried out as a separate operation.

The filtration characteristics of the mash are in part related to the fineness of the grind. A finely ground mash aids the biochemical conversion of the starch but reduces the filtration rate in the lauter tun. Coarse milling improves the filtration rate but hinders the starch conversion. It is accordingly necessary in practice to reach a compromise between good conversion and good filtration. In practice, in order to obtain high extract yields, it is considered necessary to add sparge water in excess of that needed to obtain a wort of the desired concentration in the brew kettle. The excess water must then be evaporated from the brew kettle.

Continuous lautering systems presently in use employ counter-current washing of the spent grain to obtain both a wort of the desired concentration in the brew kettle and spent grains with a low residual moisture content suitable for disposal. This is accomplished by using continuous screening centrifuges with internal washing. The problem in this type of installation is that fines pass through the screen with the wort making it necessary to clarify the wort prior to discharging it into the brew kettle. Another problem arises from the fact that the internal washes in the centrifuges are less efficient than dilution washes because the solution of the soluble extract is directly related to the time of treatment.

As examples of the patented prior art in this area, reference is made to the Henderson et al. U.S. Pat. No. 3,520,868 owned by the assignee of the present application. That patent describes a process for separating protein from soluble substances through the use of a solvent for the soluble portion. The steps involved in the process consist in introducing the protein-containing material into each of a series of succeeding zones along with a quantity of solvent from the next succeeding zone. The solvent and the dissolved material therein are then separated from the protein in each zone. The protein is passed onto the next succeeding zone for treatment. As the protein is withdrawn from the zone, the solvent containing the dissolved fats, sugars, starches and the like is also withdrawn from the zone and a portion of the withdrawn solvent is recycled back into the zone at the point of addition of the protein-containing material. The balance of the solvent is then passed back to the next preceding zones. Fresh solvent is introduced into the last zone in the series and the solvent withdrawn from the first zone is usually removed from the system for recovery, purification, or disposal.

The Harsanyi U.S. Pat. No. 3,535,116 describes a continuous method for the production of wort which includes the step of centrifuging the ground malt-water mixture continuously in a plurality of stages into a solid fraction and a liquid fraction, sparging the dehydrated solids fraction with water in controlled quantities at least in the last stage, removing the dehydrated solids, subjecting the liquid obtained by the centrifugal action to clarification, and delivering the clarified liquid to the brew kettle.

SUMMARY OF THE INVENTION

The present invention provides a series of continuous decanting centrifuges and an equal number of reslurry tanks to eliminate the problems associated with both the conventional lautering tun and the continuous lautering system using continuous screening centrifuges. Expressed generally, we provide a series of n decanting centrifuges and a series of n reslurry stations. Fresh liquid is introduced into the $n^{th}$ reslurry station, together with solids discharged from the $(n-1)^{th}$ continuous decanting centrifuge. Solids are separated from liquid in the $n^{th}$ continuous decanting centrifuge and the effluent is directed from the $n^{th}$ continuous decanting centrifuge into the $(n-1)^{th}$ reslurry station for dilution of the suspension therein. The number of stages is at least two, i.e., $n$ is equal to at least two and is usually three.

A particularly preferred embodiment of the invention as applied to a lautering process comprises utilizing at least three continuously decanting centrifuges and an equal number of reslurry stations. Fresh water is introduced as a diluent into the third reslurry station and spent grain from the second centrifuge is passed into the third reslurry station for admixture with fresh water. The mixture in this station is passed into the third centrifuge, while a thin wort effluent from the third centrifuge is passed into the second reslurry station. Spent grain from the first centrifuge is sent into the second reslurry station for admixture with the thin wort. The mixture which results is then directed into the second centrifuge. A thin wort effluent from the second centrifuge is directed into the first reslurry station where it is admixed with mash. The resulting admixture is sent to the first centrifuge, and a clarified wort is recovered as the effluent of the first centrifuge.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
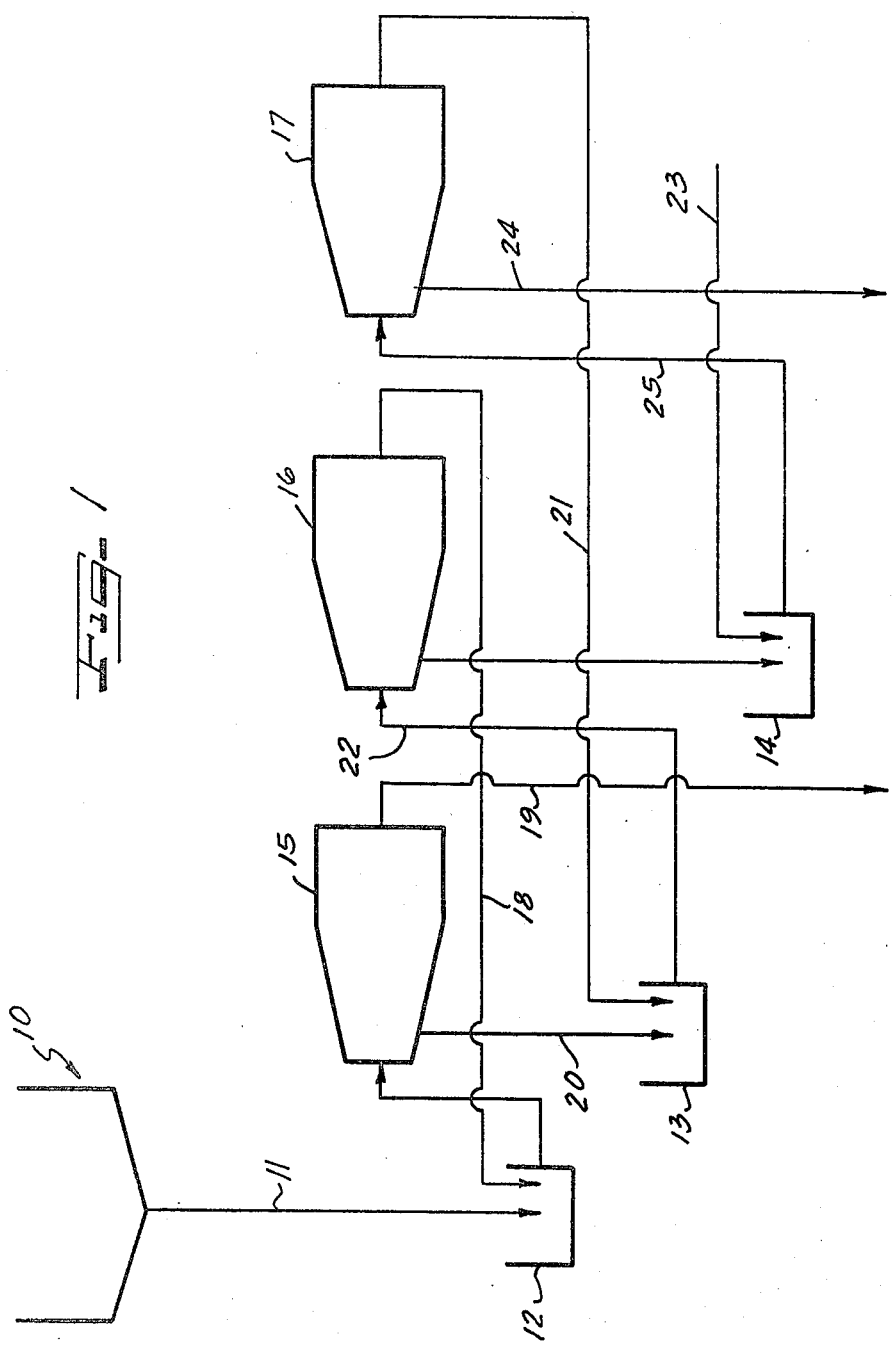
FIG. 1 is a schematic flow chart of one embodiment of the invention.

In FIG. 1, reference numeral 10 has been applied generally to a mash tun which discharges mash through a line 11 into a first reslurry tank 12. The second reslurry tank has been identified at reference numeral 13 and the third at reference numeral 14. The system shown in FIG. 1 also includes three continuous decanter centrifuges which have been identified at reference numerals 15 through 17, respectively. In the first reslurry tank 12, the mash is combined with a thin wort introduced into the tank by means of a line 18, the wort being the effluent of the second centrifuge 16. The contents of the first reslurry tank 12 are then discharged into the first continuous decanter centrifuge 15 where the spent grains are separated from the final wort. The final clear wort is discharged through a line 19 into the brew kettle while the spent grain from the first centrifuge 15 is delivered by means of a line 20 to the second reslurry tank 13. Here it is combined with a thin wort delivered by means of a line 21 from the third decanter centrifuge 17. The contents of the second reslurry tank are discharged into the second decanter centrifuge 16 by means of a line 22. In the second decanter centrifuge 16, the spent grain is separated from the thin wort and the thin wort is recycled into the first reslurry tank 12 through the line 18, as previously explained. This thin wort thus becomes a diluent in the first reslurry tank 12. The spent grains from the second continuous decanter centrifuge 16 are then mixed with fresh water introduced by means of a line 23 in the third reslurry tank 14. The contents of this tank are then discharged into the third continuous decanter centrifuge 17 by means of a line 25 where the spent grain is separated from the thin wort and then discharged from the system through a line 24. The thin wort effluent delivered by means of a line 21 to the second reslurry tank 13 becomes the dilution wash for the second stage.

Figure 2:
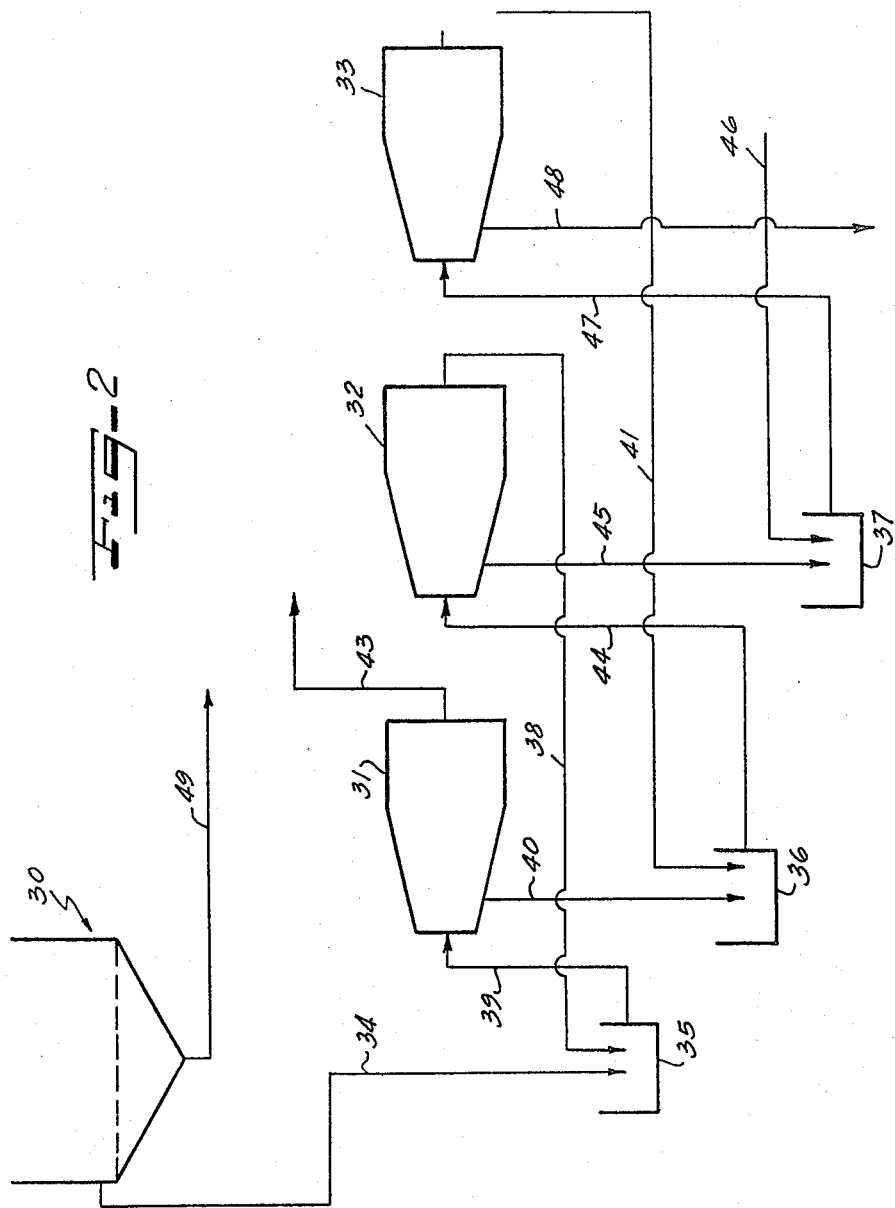
FIG. 2 is a schematic flow diagram of another form of the invention.

In the form of the invention shown in FIG. 2 of the drawings, we provide a conventional lautering tun 30 in combination with continuous decanting centrifuges 31, 32 and 33. The spent grains are sparged in the lautering tun 30 for a specified time. The spent grains are then discharged by means of a line 34 into the first of a series of reslurry tanks which have been identified at reference numerals 35, 36 and 37, respectively. The spent grains in the first reslurry tank 35 are washed with a thin wort applied by means of a line 38 as the effluent of the second centrifuge 32. The product of the first reslurry tank 35 is introduced into the first centrifuge 31 by means of a line 39. Spent grain from the first centrifuge 31 is withdrawn by means of a line 40 and delivered to a second reslurry tank 36 where it is washed with a thin wort delivered thereto by means of a line 41 from the third centrifuge 33. The effluent of the first stage 31 is sweet water which is withdrawn by means of a line 43 and may be passed directly to the mash tun.

The treated grain from the second reslurry tank 36 is delivered by means of a line 44 into the second centrifuge 32. The effluent at this stage is a thin wort which is delivered by a line 38 to the first reslurry tank 35 as previously explained. The spent grain from the second stage centrifuge 32 is delivered by means of a line 45 to the third reslurry tank 37 where it is mixed with fresh water from a line 46. The product from the third reslurry tank 37 is delivered by means of a line 47 into the third centrifuge stage 33. Spent grain from the third centrifuge stage 33 is withdrawn by means of a line 48 for disposal. The clear wort is withdrawn from the lauter tun 30 by means of a line 49 and may be passed directly to the brew kettle.

The systems of the present invention provide a combination of spent grain separation and clarification which eliminates the need for separate clarification equipment. When the feed rate, feed consistency and final wort extract concentration is specified, the wash rate is fixed. With these operating parameters specified, the reslurry tanks can be sized to allow for the soluble extract concentration to reach equilibrium prior to the subsequent separation stage. This provides optimum extract recovery for a given number of dilution washes.

The dilution washes are more efficient than internal washes and screening centrifuges because the solution of the soluble extract is a reaction dependent upon time.

When two or more centrifuges are operated in series as in the system of the present invention, the first machine can be adjusted for optimum clarity and the last machine for maximum spent grain dryness. Since the amount of extract lost from the system increases with spent grain moisture, with everything else being held constant, operating the centrifuges in this manner provides an optimum extract recovery.

Figure 3:
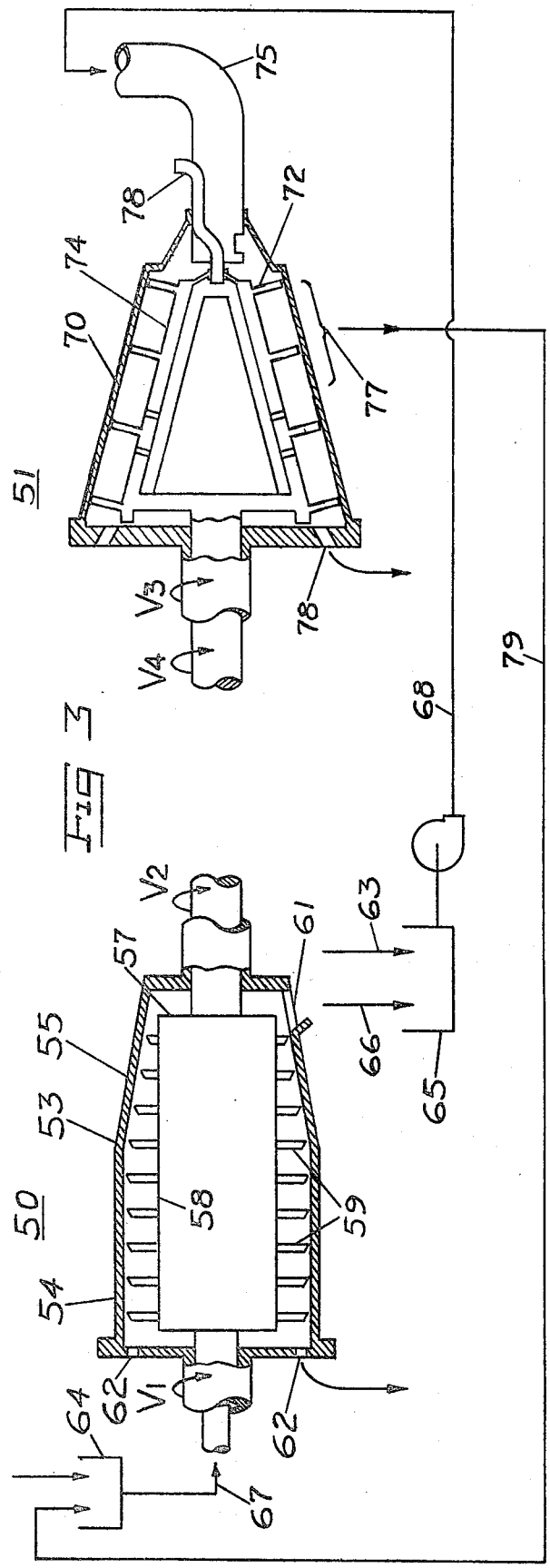
FIG. 3 is a schematic flow diagram of a preferred embodiment of the invention.

Referring to a preferred embodiment as shown in FIG. 3, a two stage continuous lautering system is shown which includes a continuous decanter centrifuge 50 in series with a continuous screening centrifuge 51.

The continuous decanter centrifuge 50 is diagrammatically shown and includes a cylindrical-conical bowl 53 having a cylindrical portion 54 and a frusto-conical portion 55. The bowl 53 is generally encompassed by a suitable casing structure (not shown). The bowl 53 is rotated at a first speed $v1$, by means not shown.

Disposed within the bowl 53 is a scroll conveyor 57. The scroll conveyor includes a generally cylindrical rotor portion 58 having a plurality of radially extending tynes or scrolls 59. The scrolls disposed within the cylindrical portion 54 of the conical bowl 53 are substantially the same size and radially extend to the inner peripheral wall thereof. The scrolls 59 in the conical portion 55 progressively decrease in size to conform to the sloped inner peripheral wall portion. The scroll conveyor 57 is rotated, by means not shown, in the same direction as the bowl 53 but at a second speed $V2$ by any suitable means not shown.

The cylindrical-conical bowl of the continuous decanter centrifuge 50 is generally utilized to separate the solids from a liquid portion. The solids are separated from the liquid by centrifugal force which throws the solids against the wall of the rotating bowl 53. The solids are removed by the scroll conveyor 57, which rotates within the bowl 53 at a slightly different speed than that of the bowl. The particles are conveyed to the small end of the bowl where they leave the liquid layer and discharge through outlet ports 61. The clarified liquid discharges through the adjustable ports 62 at the large end of the bowl 53 in a highly clarified form. The frusto-conical bowl 53 allows for substantial retention requirements within the decanter centrifuge 50.

A first reslurry tank 64 is disposed upstream from the decanter centrifuge 50 and a second reslurry tank 65 is disposed downstream from the decanter centrifuge. The first reslurry tank 64 is connected by line 67 to the inlet of the decanter 50. The second reslurry tank 65 is connected through line 68 to the inlet of the screening centrifuge 51.

The screening centrifuge 51 has a frusto-conical screened basket 70 which is rotated by means, not shown, at a velocity V3. A bladed rotor assembly 71 is integral with and projects radially inwardly from the basket 70 to convey solids towards the large end of the centrifuge.

Disposed concentrically within the screen 70 is a generally frusto-conically shaped scroll conveyor 72. The scroll conveyor has a plurality of radially extending scroll portions 74. The conveyor 72 is rotated by means, not shown, at a velocity V4.

The feed enters the small end 75 of the screened rotating basket 70. The feed accelerates to the speed V3 of the rotating screen and is distributed thereon. Liquid, propelled by the centrifugal force, passes through the screen and leaves by the filtrate outlet 77. The centrifugal screening effect is less efficient in removal of solids than the decanter centrifuge, although more moisture is removed from the solids.

The solids are retained on the screen and move to the large end thereof at a rate controlled by the scroll 72 which rotates at velocity V4 which is slightly lower than the basket velocity V3. If desired, washing occurs when the solids have traveled a preselected distance along the screen 70. Wash liquid enters through inlet 78 which enters the scroll conveyor area and under centrifugal pressure through corresponding ports in the scroll, flows through the solids, and leaves through the screen 70.

The solids are ejected from the large end of the basket 70 through suitable ports 78 by a rotor assembly 71. The filtrate goes through line 79 to the first reslurry tank 64.

Figure 4:
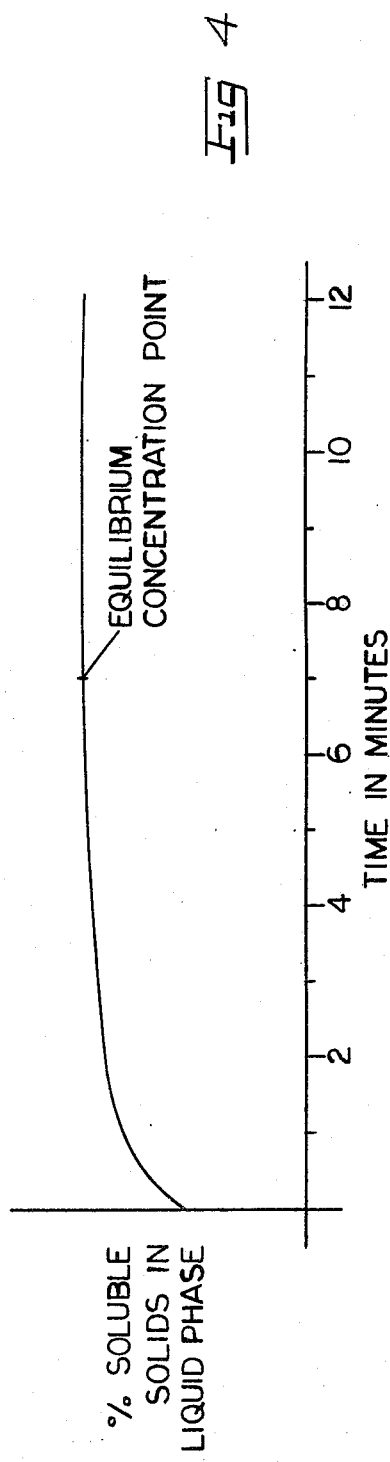
FIG. 4 is a graph of percent of soluble solids in liquid phase vs. time.

Referring to FIG. 4, it can be graphically seen that for wort, there is a time dependency relation before the soluble solids are converted into the liquid phase. For example, according to FIG. 4, it takes approximately two minutes before a substantial portion of the soluble solids of the wort to be converted to the liquid phase. It takes approximately 7 minutes for the soluble solids to reach the equilibrium concentration point. This reemphasizes once again the critical importance of using a reslurry tank before each centrifuge stage. In this manner, it can be assured that most of the soluble solids will be in the liquid phase before it goes into the centrifuge.

In operation, mash is introduced into the first reslurry tank 64 and is combined with the thin wort effluent through line 79 from the screening centrifuge 51. The tank 64 is sized so that there is time for a majority of the soluble solids in the tank 64 to reach approximately equilibrium concentration in the liquid phase. The combination is then fed into the continuous decanter centrifuge 50. The partially spent grains are separated in the decanter centrifuge 50 and removed from the outlet ports 61. The clear wort is discharged through outlet ports 62 and comprises the final or concentrated wort used to make the brew without the necessity of further clarification. The solids are delivered through line 66 to the second reslurry tank 65 to which is added clear water through line 63. Again, it is of critical importance that the spent grain from the centrifuge 50 is allowed to be retained within the reslurry tank 65 for a sufficient amount of time to insure that a predetermined percent of the soluble solids are converted to the liquid phase, i.e., that it substantially obtains equilibrium concentration. The combination is then pumped through line 68 to the inlet of the screening centrifuge 51.

The spent grain is separated from the thin wort within the screening centrifuge 51. The spent grain is extracted therefrom and is disposed of in this embodiment. It will be obvious, however, that the spent grain can be further refined in a manner similar to that shown in FIGS. 1 and 2 and a third centrifuge can be utilized, preferably of the continuous screening type. The thin wort is washed and the combination of the wash and the thin wort is discharge through screen 70 at outlet 77, and is discharged through line 79 to the first reslurry tank 64.

All of the embodiments shown utilize a continuous decanter centrifuge in the first separation process. This is absolutely necessary to insure that the final concentrated wort removed from the decanter is of sufficient purity so that no further clarification is necessary prior to the brewing step.

To further emphasize the importance of using a continuous decanter centrifuge rather than a screening centrifuge in the first stage clarification process, is that the continuous decanter type centrifuge removes approximately ten times more insoluble solids from the liquid discharge as a screening type centrifuge. For example, the solids concentration in the effluent discharge from a screening centrifuge expressed as a weight percent of insoluble solids is 0.18 percent to 0.20 percent. By comparison, the solids concentration in the effluent discharge from a decanter centrifuge expressed as a weight percent of insoluble solids is 0.015 percent to 0.02 percent. Therefore by using a continuous decanter centrifuge, the effluent is acceptable "as is" while the effluent from a screening centrifuge utilized in the first step would require clarification prior to further treatment in the brewing process. To exemplify this extra step, reference should be had to the previously mentioned Harsanyi patent whereby the extra step is necessary for clarification.

The second and any subsequent centrifuge is preferably of the screening type as this provides two advantages over utilization of a decanter centrifuge in the second or successive stages: (a) the screening centrifuge is generally less expensive (about one-half the cost) of the decanter centrifuge; and (b) the screening centrifuge produces a dryer solid or grain portion than the continuous centrifuge. The overall recovery efficiency for the two stage system, as shown in FIG. 3, is approximately 96 percent. Adding a third stage screening centrifuge increases the efficiency of the system to approximately 99 percent.

It should be evident that various modifications can be made to the described embodiments without departing from the scope of the present invention.

What is claimed is:

1. The method of separating wort from grain in mash which comprises the steps of:
   1. Introducing a mash comprising a combination of wort and grain into a first reslurry station and combining the mash with thin wort;
   2. Retaining the combination of wort and grain for a specified time within the first reslurry station to allow soluble solids from the grain to reach substantial equilibrium concentration;
   3. Directing the resultant combination to a continuous decanting centrifuge;
   4. Separating the wort from the grain in the centrifuge;
   5. Removing the wort and soluble solids from the centrifuge;
   6. Removing the partially spent grain to a second reslurry station and combining the grain with water;
   7. Allowing the combination of the partially spent grain and water to be retained for a specified time within the second reslurry station to convert soluble solids from the grain to reach substantial equilibrium concentration;
   8. Directing the combination from the second reslurry station to a second screening centrifuge;
   9. Separating the wort from the grain in the second centrifuge by a continuous screening centrifugal action to form a thin wort;
   10. Removing the spent grains and thin wort from the second centrifuge; and
   11. Directing the thin wort to the first reslurry station for combination with the mash.

2. The method separating wort from insoluble grain in a mash which comprises the steps of:
   1. Introducing a combination of mash and thin wort into a first reslurry station;
   2. Allowing the combination from said first station to be retained for a specified time within said reslurry station to allow soluble solids to achieve substantial equilibrium concentration;
   3. Directing the resultant combination to a first continuous decanting centrifuge;
   4. Separating wort from the grain in said centrifuge;
   5. Removing the clear wort from said centrifuge;
   6. Removing the first partially spent grain from said centrifuge and directing it to a second reslurry station and combining said partially spent grain with thin wort from a third centrifuge;
   7. Allowing the combination in said second reslurry station to be retained for a specified time within said reslurry station to achieve substantial equilibrium concentration;
   8. Directing the combination of the second reslurry station to a second centrifuge;
   9. Separating the soluble solids and liquids from the grain in the centrifuge by a continuous screening centrifugal action;
   10. Directing the resultant thin wort from said second centrifuge to the first reslurry station for combination with the mash;
   11. Removing the second spent grain from said second centrifuge to a third reslurry station;
   12. Adding water to said third reslurry station with said second spent grains;
   13. Allowing the combination in said third reslurry station to be retained for a specified time therewithin to achieve substantial equilibrium concentration;
   14. Separating the soluble solids and liquid portions within said third centrifuge from the insoluble grain;
   15. Removing the thin wort from said third centrifuge and directing the thin wort into said second reslurry station; and
   16. Removing the spent grain from said third centrifuge.

3. The method separating wort from insoluble grain in a mash which comprises the steps of:
   1. Introducing a combination of mash and thin wort into a first reslurry station;
   2. Allowing the combination from said first station to be retained for a specified time within said reslurry station to allow soluble solids to achieve substantial equilibrium concentration;
   3. Directing the resultant combination to a first continuous decanting centrifuge;
   4. Separating wort from the grain in said centrifuge;
   5. Removing the clear wort from said centrifuge;
   6. Removing the first partially spent grain from said centrifuge and directing it to a second reslurry station and combining said partially spent grain with thin wort from a third centrifuge;
   7. Allowing the combination in said second reslurry station to be retained for a specified time within said reslurry station to achieve substantial equilibrium concentration;
   8. Directing the combination of the second reslurry station to a second centrifuge;
   9. Separating the soluble solids and liquids from the grain in the centrifuge;
   10. Directing the resultant thin wort from said second centrifuge to the first reslurry station for combination with the mash;
   11. Removing the second spent grain from said second centrifuge to a third reslurry station;
   12. Adding water to said third reslurry station with said second spent grains;
   13. Allowing the combination in said third reslurry station to be retained for a specified time therewithin to achieve substantial equilibrium concentration;
   14. Separating the soluble solids and liquid portions within said third centrifuge from the insoluble grain by a continuous screening centrifugal action;
   15. Removing the thin wort from said third centrifuge and directing the thin wort into said second reslurry station; and
   16. Removing the spent grain from said third centrifuge.

* * * * *